US011913416B2

(12) United States Patent
Ishii

(10) Patent No.: US 11,913,416 B2
(45) Date of Patent: Feb. 27, 2024

(54) CONTROL APPARATUS FOR VEHICLE

(71) Applicant: TOYOTA JIDOSHA KABUSHIKI KAISHA, Toyota (JP)

(72) Inventor: Kenichi Ishii, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/191,059

(22) Filed: Mar. 28, 2023

(65) Prior Publication Data

US 2023/0349350 A1 Nov. 2, 2023

(30) Foreign Application Priority Data

Apr. 1, 2022 (JP) ................................. 2022-062109

(51) Int. Cl.
*F02N 11/08* (2006.01)
*F02N 11/00* (2006.01)

(52) U.S. Cl.
CPC ........ *F02N 11/0814* (2013.01); *F02N 11/006* (2013.01); *F02N 11/0859* (2013.01)

(58) Field of Classification Search
CPC . F02N 11/0814; F02N 11/006; F02N 11/0859
See application file for complete search history.

(56) References Cited

U.S. PATENT DOCUMENTS

| 2003/0109357 | A1* | 6/2003 | Tabata | B60W 10/026 477/109 |
| 2004/0084234 | A1* | 5/2004 | Yatabe | B60W 20/00 903/910 |
| 2012/0025601 | A1* | 2/2012 | Nefcy | F02N 11/0866 180/65.285 |
| 2015/0321664 | A1* | 11/2015 | Bae | B60L 3/0023 180/65.265 |
| 2016/0152128 | A1* | 6/2016 | Minegishi | B60K 6/28 180/65.265 |
| 2016/0229309 | A1* | 8/2016 | Mitsutani | B60L 50/62 |
| 2017/0050635 | A1* | 2/2017 | Kitahata | B60W 50/0205 |

(Continued)

FOREIGN PATENT DOCUMENTS

| JP | 2002-115578 A | 4/2002 |
| JP | 2012136064 A * | 7/2012 |

(Continued)

*Primary Examiner* — Joseph J Dallo
(74) *Attorney, Agent, or Firm* — Oblon, McClelland, Maier & Neustadt, L.L.P.

(57) ABSTRACT

A control apparatus for a vehicle that is provided with (i) an engine, (ii) a first starting device including an electric motor and a high-voltage power supply device, such that the first starting device cranks the engine by using the electric motor, (iii) a second starting device including a starter motor and a low-voltage power supply device, such that the second starting device cranks the engine by using the starter motor, and (iv) various kinds of electrical equipment operable by an electric power supplied from the low-voltage power supply device. In a case in which start of the engine by cranking the engine by using the first starting device has failed and then the start of the engine by cranking the engine by using the second starting device has failed, the control apparatus cranks the engine by using the second starting device again.

4 Claims, 3 Drawing Sheets

(56) References Cited

U.S. PATENT DOCUMENTS

2017/0106758 A1     4/2017   Sakatani et al.
2019/0326772 A1*   10/2019   Shields .................. B60L 50/10

FOREIGN PATENT DOCUMENTS

| JP | 2015-161253 A | | 9/2015 | |
|----|---------------|---|--------|---|
| JP | 2021156293 A | * | 10/2021 | |
| WO | WO 2015/015743 A1 | | 2/2015 | |
| WO | WO-2021106518 A1 | * | 6/2021 | ............ B60W 10/02 |

* cited by examiner

CONTROL APPARATUS FOR VEHICLE

This application claims priority from Japanese Patent Application No. 2022-062109 filed on Apr. 1, 2022, the disclosure of which is herein incorporated by reference in its entirety.

FIELD OF THE INVENTION

The present invention relates to a control apparatus for a vehicle that is provided with an engine and a plurality of starting devices for starting the engine.

BACKGROUND OF THE INVENTION

There is well-known a control apparatus for a vehicle that is provided with an engine, two power supply devices and a cranking device that is to be operated with an electric power supplied from the power supply devices to crank the engine. WO/2015/015743 discloses a vehicular power source system as an example of such a control apparatus. In the disclosed system, when the engine is to be restarted, a starter as the cranking device is operated by the electric power supplied form a secondary battery as one of the power supply devices, and the starter is operated by the electric power supplied from a lead-acid battery as another one of the power supply devices when the vehicle is in an environment whose temperature is lower than a certain degree in a case in which the restart of the engine is attempted again after the engine restart has failed.

SUMMARY OF THE INVENTION

By the way, there is a case in which, after the failure of the engine restart, the engine restart fails once again. In this case, the engine start failed with supply of the electric power from either of the secondary battery and the lead-acid battery. Therefore, when the engine start is attempted once again, it is unknown which one of the two power supply devices can be used to supply the electric power, so that the engine start is likely to fail once again.

The present invention was made in view of the background art described above. It is therefore an object of the present invention to provide a control apparatus for a vehicle, wherein the control apparatus is capable of increasing a probability of successful start of the engine when the engine is to be started.

The object indicated above is achieved according to the following aspects of the present invention.

According to a first aspect of the invention, there is provided a control apparatus for a vehicle, wherein the vehicle is provided with (i) an engine, (ii) a first starting device including an electric motor connected to the engine in a power transmittable manner and a high-voltage power supply device configured to supply and receive an electric power to and from the electric motor, such that the first starting device is configured to crank the engine by using the electric motor, (iii) a second starting device including a starter motor configured to drive and rotate the engine and a low-voltage power supply device chargeable by the high-voltage power supply device and configured to supply the electric power to the starter motor, such that the second starting device is configured to crank the engine by using the starter motor, and (iv) a plurality of kinds of electrical equipment configured to be operated by the electric power supplied from the low-voltage power supply device. The control apparatus includes a starting control portion that is configured, in a case in which start of the engine by cranking the engine by using the first starting device has failed and then the start of the engine by cranking the engine by using the second starting device has failed, to configured to crank the engine by using the second starting device again.

According to a second aspect of the invention, in the control apparatus according to the first aspect of the invention, when the engine is to be started, the starting control portion is configured to crank the engine by using the first starting device with a higher priority than using the second starting device, and the starting control portion is configured to allow execution of an idle stop control for temporarily stopping the engine in a case in which the starting control portion determines that the start of the engine by cranking the engine by using the second starting device is guaranteed, and is configured to inhibit the execution of the idle stop control in a case in which the starting control portion determines that the start of the engine by cranking the engine by using the second starting device is not guaranteed.

According to a third aspect of the invention, in the control apparatus according to the second aspect of the invention, the starting control portion is configured, in a case in which the engine has been successfully started by cranking the engine by using the second starting device, to determine whether the start of the engine by cranking the engine by using the second starting device is guaranteed or not, depending on whether an output voltage of the low-voltage power supply device upon successful start of the engine is at least a predetermined voltage value or not.

According to a fourth aspect of the invention, in the control apparatus according to the second or third aspect of the invention, the starting control portion is configured to crank the engine by using the second starting device in place of using the first starting device, in a case in which the starting control portion determines that the vehicle is in a cryogenic environment that disables the electric motor from being appropriately controlled when the engine is to be started.

According to a fifth aspect of the invention, in the control apparatus according to the second or third aspect of the invention, the idle stop control includes at least one of a control executed to temporarily stop the engine during running or stop of the vehicle and a control executed to keep stopping the engine without starting the engine when the vehicle has not started to run after power ON of the vehicle.

In the control apparatus according to the first aspect of the invention, in the case in which the start of the engine by cranking the engine by using the first starting device (including the electric motor and the high-voltage power supply device) has failed and then the start of the engine by cranking the engine by using the second starting device (including the low-voltage power supply device configured to supply the electric power to the starter motor and the plurality of kinds of electrical equipment) also has failed, the engine is cranked by using the second starting device again. The failure of the start of the engine using the second starting device may be caused due to a temporary overlap between operation of the starter motor and operations of the electrical equipment, so that the start of the engine could be successfully done by reattempting the start of the engine using the second starting device. Thus, it is possible to increase a probability of successful start of the engine when the engine is to be started.

In the control apparatus according to the second aspect of the invention, when the engine is to be started, the engine is cranked by using the first starting device with a higher priority than using the second starting device, such that the execution of the idle stop control is allowed in the case in which it is determined that the start of the engine by cranking the engine by using the second starting device is guaranteed, and such that the execution of the idle stop control is inhibited in the case in which it is determined that the start of the engine by cranking the engine by using the second starting device is not guaranteed. Therefore, it is possible to avoid or suppress the failure of the start of the engine after the idle stop control is terminated.

In the control apparatus according to the third aspect of the invention, in the case in which the engine has been successfully started by cranking the engine by using the second starting device, it is determined whether the start of the engine by cranking the engine by using the second starting device is guaranteed or not, depending on whether the output voltage of the low-voltage power supply device upon successful start of the engine is at least the predetermined voltage value or not. Thus, it is possible to estimate or know a condition of the low-voltage power supply device, with reference to the output voltage of the low-voltage power supply device during the cranking of the engine using the second starting device, so that it is possible to avoid unnecessary inhibition of the execution of the idle stop control, i.e., lost of opportunity of the execution of the idle stop control, which could be caused if the condition of the low-voltage power supply device is unknown.

In the control apparatus according to the fourth aspect of the invention, the engine is cranked by using the second starting device in place of using the first starting device, in the case in which it is determined that the vehicle is in the cryogenic environment that disables the electric motor from being appropriately controlled when the engine is to be started. Thus, it is possible to avoid or suppress the failure of the start of the engine.

In the control apparatus according to the fifth aspect of the invention, the idle stop control includes the control executed to temporarily stop the engine during running or stop of the vehicle and/or the control executed to keep stopping the engine without starting the engine when the vehicle has not started to run after power ON of the vehicle, so that it is possible to improve the energy efficiency.

DETAILED DESCRIPTION OF PREFERRED EMBODIMENT

Hereinafter, the preferred embodiment of the invention will be described in detail with reference to the accompanying drawings.

Embodiment

Figure 1:
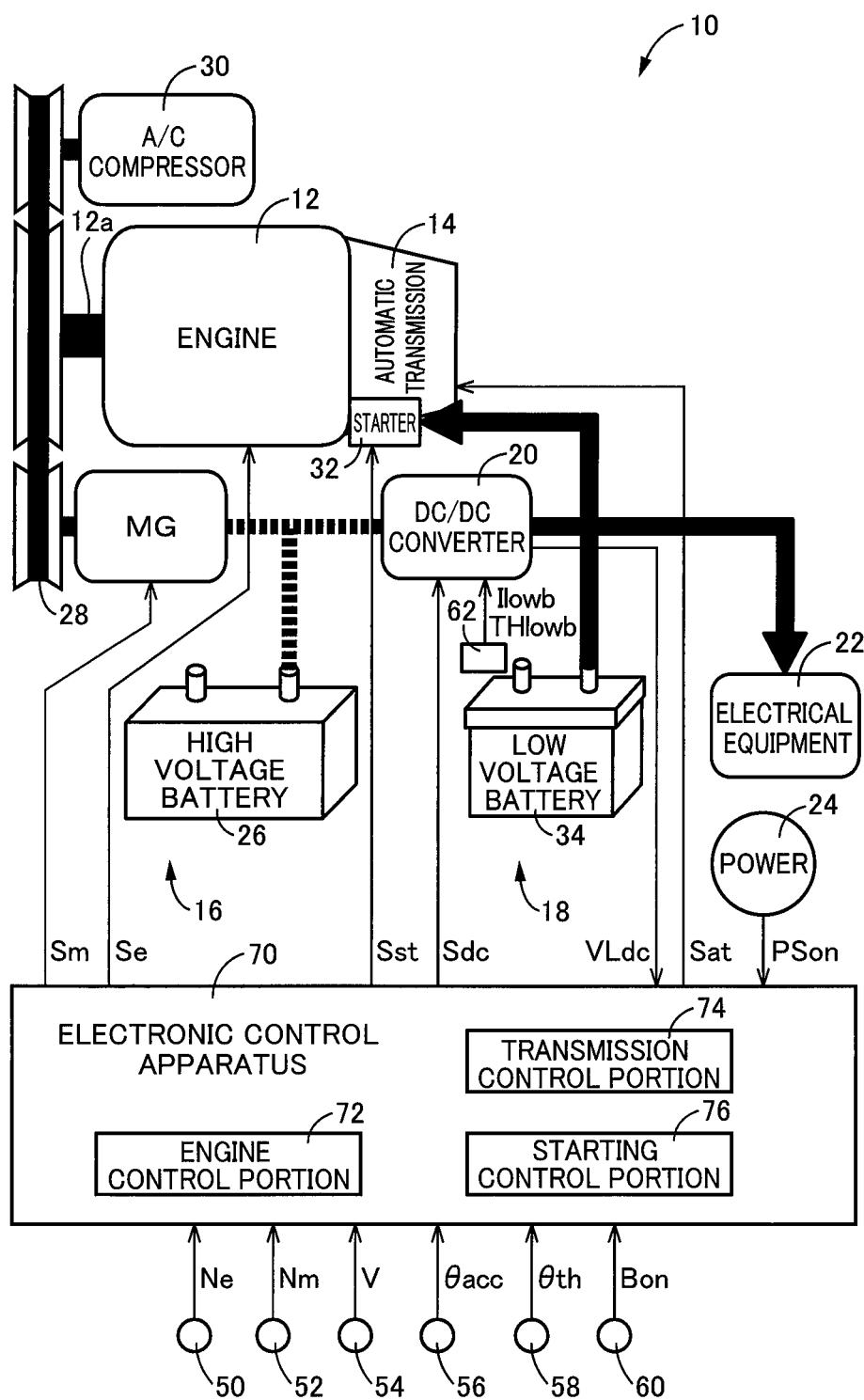
FIG. 1 is a view schematically showing a construction of a vehicle to which the present invention is applied, for explaining major portions of control functions and control systems that are provided to perform various control operations in the vehicle.

FIG. 1 is a view schematically showing a construction of a vehicle 10 to which the present invention is applied, for explaining major portions of control functions and control systems that are provided to perform various control operations in the vehicle 10. As shown in FIG. 1, the vehicle 10 is provided with an engine 12, an automatic transmission 14, a first starting device 16, a second starting device 18, a DC/DC converter 20, electrical equipment (electric loads) 22 and a start button 24.

The engine 12, which is a drive power source, is a known internal combustion engine such as gasoline engine and diesel engine. The vehicle 10 is provided with an engine control device (not shown) that includes a throttle actuator, a fuel injection device and an ignition device. With the engine control device being controlled by an electronic control apparatus 70 that is described below, an engine torque Te, which is an output torque of the engine 12, is controlled.

The automatic transmission 14 is may be constituted by a known automatic transmission of planetary gear type, a synchronous mesh twin shaft parallel axis-type automatic transmission including a known DCT (Dual Clutch Transmission), a known belt-type continuously variable transmission or a known electrically-operated continuously variable transmission, for example. The engine 12 is connected to the automatic transmission 14 in a power transmittable manner, such that a drive power of the engine 12 is to be transmitted toward drive wheels (not shown).

The first starting device 16 includes an electric motor MG and a high voltage battery 26. The electric motor MG is a motor generator having a function serving as a motor for generating a mechanical power from an electric power and also a function serving as a generator for generating an electric power from a mechanical power. The electric motor MG is connected to the high voltage battery 26 through an inverter that is provided integrally with the electric motor MG. The high voltage battery 26 is an electric-power storage device for supplying and receiving the electric power to and from the electric motor MG. With the inverter being controlled by the electronic control apparatus 70, an MG torque Tm, which is a torque of the electric motor MG, is controlled. The electric motor MG is driven by electric power supplied from the high voltage battery 26 during power driving. The electric motor MG supplies the generated electric power to the high voltage battery 26 during regeneration.

The electric motor MG is connected in a power transmittable manner to a crankshaft 12a of the engine 12 via a drive belt 28 provided on the vehicle 10. The electric motor MG has a function of rotating or cranking the engine 12 by power driving operation when the engine 12 is stopped. That is, the first starting device 16 has a function of cranking the engine 12 by using the electric motor MG. Further, the electric motor MG has a function of assisting the power of the engine 12 by the power driving operation when the engine 12 is operated. Still further, the electric motor MG has a function of generating the electric power from the power of the engine 12 by regenerative operation when the engine 12 is operated. Moreover, the electric motor MG has a function of generating the electric power from a driven force inputted from the drive wheels by the regenerative operation during deceleration running of the vehicle 10.

To the crankshaft 12a of the engine 12, not only the electric motor MG but also auxiliary devices provided in the vehicle 10 are operatively connected through the drive belt 28, so that the auxiliary devices are to be operated or driven by the engine 12, wherein the auxiliary devices include an A/C compressor 30 (that is a compressor for an air conditioner), a power steering pump (not shown) and a water pump (not shown). Where the electric motor MG and the auxiliary devices such as the A/C compressor 30 are connected to the crankshaft 12a through an electromagnetic clutch (not shown), for example, the electric motor MG and the auxiliary devices are to be operated or driven by only the electric motor MG when the electromagnetic clutch is released. That is, the electric motor MG has a function of driving the auxiliary devices such as the A/C compressor 30 during an idle stop control CTspidl that is executed to temporarily stop operation of the engine 12.

The idle stop control CTspidl is an automatic engine stop control that is executed to automatically stop the engine 12 by fuel cut or the like, and to automatically restart the engine 12 in case of satisfaction of a restart condition such as release of a brake pedal and depression of an acceleration pedal. The idle stop control CTspidl includes a normal idle-stop control S&S (Stop and Start) for temporarily stopping the engine 12 during running or stop of the vehicle 10 and a pre-start-stage idle-stop control FIS (First Idling Stop) for keeping stopping the engine 12 without starting the engine 12 when the vehicle 10 has not started to run after power ON of the vehicle 10. The normal idle-stop control S&S is a post-start-stage idle stop control. The power ON of the vehicle 10 corresponds to a state of an ignition ON (IG-ON).

The second starting device 18 includes a starter motor 32 and a low voltage battery 34. The starter motor 32 is configured to drive and rotate the engine 12. The starter motor 32 is a motor used for staring the engine 12, and is to be driven by the electric power supplied from the low voltage battery 34. That is, the starter motor 32 is a motor exclusively for driving and rotating the engine 12, namely, cranking the engine 12 when the engine 12 is to be started. The second starting device 18 has a function of cranking the engine 12 by using the starter motor 32.

The DC/DC converter 20 is connected to the high voltage battery 26. The DC/DC converter 20 is configured to lower a voltage of the electric power supplied from the high voltage battery 26, and to supply the electric power (whose voltage has been lowered) to the low voltage battery 34 and the electrical equipment 22 so as to charge the low voltage battery 34 and so as to operate the electrical equipment 22. The low voltage battery 34 is connected to the DC/DC converter 20, so as to be charged with the electric power originally supplied from the high voltage battery 26 through the DC/DC converter 20. The low voltage battery 34 is a low-voltage power supply device which is to be chargeable by the high voltage battery 26 and which is configured to supply the electric power to the starter motor 32. The high voltage battery 26 is a high-voltage power supply device for storing the electric power whose voltage is higher than the voltage of the electric power stored in the low voltage battery 34, and is capable of charging the low voltage battery 34. The high voltage battery 26 is a second battery such as lithium-ion battery and nickel-metal hydride battery. The low voltage battery 34 is a secondary battery such as lead-acid battery.

The electrical equipment 22 consist of a plurality of kinds of electrically-operated devices that are to be operated by the electric power supplied from the low voltage battery 34, for example. The electrical equipment 22 include a wiper, a blower motor and a navigation system, for example.

The start button 24 is a power switch that is to be operated by a driver of the vehicle 10 (hereinafter referred to as "vehicle driver") to switch a state of a vehicle power, i.e., a state of supply of the electric power in the vehicle 10. The start button 24 is a momentary-type push button switch, for example, and is to be operatively pressed to a switch ON position by the vehicle driver. Each time being operatively pressed to the switch ON position, the start button 24 outputs a power switch signal PSon indicative of the switch ON position, and the outputted power switch signal PSon is supplied to the electronic control apparatus 70, such that the electronic control apparatus 70 detects the operation of the start button 24 by the vehicle driver when receiving the power switch signal PSon.

The state of the vehicle power is categorized into an OFF state, an ACC state that is an accessory-ON state as a partial ON state, and an IG-ON state that is an ignition ON state as an ON state. The OFF state is a state that disables the vehicle 10 to run and disables also a part of functions that is not involved in running of the vehicle 10. The ACC state is a state that disables the vehicle 10 to run with a combination meter (not shown) being tuned off and enables a part of functions that is not involved in running of the vehicle 10. The IG-ON state is a state that enables the vehicle 10 to run with the combination meter being turned on.

The vehicle 10 is further provided with the above-described electronic control apparatus 70 including a control apparatus for the vehicle 10. For example, the electronic control apparatus 70 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 70 may be constituted by two or more control units exclusively assigned to perform different control operations such as an engine control operation and a transmission control operation, as needed.

The electronic control apparatus 70 receives various input signals based on values detected by respective sensors provided in the vehicle 10. Specifically, the electronic control apparatus 70 receives: an output signal of the DC/DC converter 20 indicative of a DC/DC power supply voltage VLdc; an output signal of the start button 24 that is the power switch signal P Son; an output signal of an engine speed sensor 50 indicative of an engine rotational speed Ne that is a rotational speed of the engine 12; an output signal of an MG speed sensor 52 indicative of a motor rotational speed Nm that is a rotational speed of the electric motor MG; an output signal of a vehicle speed sensor 54 indicative of a running speed V of the vehicle 10; an output signal of an accelerator-opening degree sensor 56 indicative of the accelerator opening degree (accelerator operation degree) θacc corresponding to an amount of operation of an acceleration operating member made by the vehicle driver; an output signal of a throttle-valve-opening degree sensor 58 indicative of a throttle opening degree θth that is an opening degree of an electronic throttle valve; and an output signal of a brake switch 60 that is a brake ON signal Bon representing a state in which the brake pedal is being operated by the vehicle driver so as to operate wheel brakes.

The DC/DC power supply voltage VLdc is an output voltage of the DC/DC converter 20 to which the output voltage of the high voltage battery 26 has been lowered, and is supplied to the low voltage battery 34, for example. The DC/DC power supply voltage VLdc represents an output voltage of the low voltage battery 34 as well as the output voltage of the DC/DC converter 20. The DC/DC converter 20 includes a microcomputer, for example, and has a function of detecting the DC/DC power supply voltage VLdc. The DC/DC converter 20 receives various input signals based on values detected by a low-voltage battery sensor 62 provided in the vehicle 10, wherein the various input signals include a low-voltage battery temperature THlowb that is a temperature of the low voltage battery 34 and a low-voltage battery charging/discharging electric current Ilowb that is a charging/discharging electric current of the low voltage battery 34.

The electronic control apparatus 70 generates various output signals to the various devices provided in the vehicle 10, such as: an engine control command signal Se that is to be supplied to the engine 12; a transmission control command signal Sat that is to be supplied to the automatic transmission 14; an MG control command signal Sm that is to be supplied to the rotating machine MG; a DC/DC control command signal Sdc that is to be supplied to the DC/DC converter 20; and a starter control command signal Sst that is to be supplied to the starter motor 32.

For performing various control operations, the electronic control apparatus 70 includes an engine control means in the form of an engine control portion 72, a transmission control means in the form of a transmission control portion 74 and a start control means in the form of a starting control portion 76.

The engine control portion 72 calculates a drive request amount requested to the vehicle 10 by the vehicle driver, by applying the accelerator opening degree θacc and the vehicle running speed V to a drive request amount map, for example, wherein the drive request amount is a requested drive torque Trdem [Nm] that is to be applied to the drive wheels, for example, and wherein the drive request amount map represents a pre-stored relationship obtained by experimentation or determined by an appropriate design theory. As the requested drive amount, another value such as a requested drive force Frdem [N] to be applied to the drive wheels may be used, too. The engine control portion 72 outputs the engine control command signal Se for controlling the engine 12 such that the requested drive torque Trdem is realized by the outputted engine control command signal Se supplied to the engine control device 72, by taking account of various factors such as a transmission loss, an auxiliary device load and a gear ratio of the automatic transmission 14.

The transmission control portion 74 determines whether a shifting action is to be executed in the automatic transmission 14, by using, for example, a shifting map that represents a predetermined relationship, and outputs the transmission control command signal Sat, as needed, which is supplied to the automatic transmission 14, for executing the shifting action in the automatic transmission 14, depending on the determination using the shifting map. In the shifting map, the predetermined relationship is represented by shifting lines in two-dimensional coordinates in which the vehicle running speed V and the requested drive torque Trdem as two variables are taken along respective two axes, wherein the shifting lines are used for the determination as to whether the shifting action is to be executed in the automatic transmission 14.

The starting control portion 76 determines whether the start of the engine 12 is requested or not, namely, whether an operation state of the engine 12 is requested to be switched from its stopped state to its driven state. In this determination, an affirmative determination is made, for example, when a pre-start-stage idle-stop control FIS is not being executed when the vehicle power is placed in the IG-ON state, and/or when the idle stop control CTspidl is terminated when the brake ON signal Bon is switched to OFF during execution of the idle stop control CTspidl. In the following description regarding the present embodiment, the request for start of the engine 12 upon termination of the idle stop control CTspidl will be referred to as "request for restart of the engine 12, when being distinguished from the request for first start of the engine 12 upon switching of the vehicle power from the OFF state to the IG-ON state.

When determining that the start of the engine 12 is requested, the starting control portion 76 cranks the engine 12 by using the first starting device 16. Specifically described, when determining that the start of the engine 12 is requested, the starting control portion 76 outputs, to the electric motor MG, the MG control command signal Sm for causing the electric motor MG to output a cranking torque Tcr. Further, the starting control portion 76 outputs, to the engine 12, the engine control command signal Se for initiating fuel supply and engine ignition, in conjunction with cranking of the engine 12 by the electric motor MG. The cranking torque Tcr is a predetermined torque required for increasing the engine rotational speed Ne, namely, for cranking the engine 12. The cranking torque Tcr is, for example, a constant torque that is predetermined based on, for example, specifications of the engine 12.

In a case in which the maximum dischargeable amount of the high voltage battery 26 is small or when the supply of the electric power from the high voltage battery 26 is difficult, when the engine 12 is to be started, it is difficult to appropriately control the electric motor MG. Therefore, there is a case in which the start of the engine 12 by cranking the engine 12 by using the first starting device 16 is difficult to be done, for example, when the vehicle 10 is in a predetermined cryogenic environment in which it is determined that the electric motor MG cannot be appropriately controlled.

In a case in which the vehicle 10 is in the predetermined cryogenic environment in which it is determined that the electric motor MG cannot be appropriately controlled, when the engine 12 is to be started, the starting control portion 76 is configured to crank the engine 12 by using the second starting device 18 in place of using the first starting device 16. Specifically described, when determining that the start of the engine 12 is requested, the starting control portion 76 determines whether the vehicle 10 is in the predetermined cryogenic environment or not. When determining that the vehicle 10 is in the predetermined cryogenic environment, the starting control portion 76 outputs, to the starter motor 32, the starter control command signal Sst for operating the starter motor 32, so as to crank the engine 12 by using the starter motor 32. Further, in this instance, the starting control portion 76 outputs, to the engine 12, the engine control command signal Se for initiating the fuel supply and the engine ignition, in conjunction with the cranking of the engine 12 by the starter motor 32. When the engine 12 is placed in a complete explosion state, the starting control portion 76 stops the cranking of the engine 12 by the starter motor 32, by stopping output of the starter control command signal Sst.

Thus, the starting control portion 76 is configured, when the engine 12 is to be started, to crank the engine 12 by using the first starting device 16 with a higher priority than using the second starting device 18. That is, the cranking of the engine 12 with use of the first starting device 16 is executed preferentially, when the engine 12 is to be started due to switching of the vehicle power from the OFF state to the IG-ON state or due to termination of the idle stop control CTspidl. On the other hand, in the cryogenic environment, the engine 12 is cranked with use of the second starting device 18 in place of the first starting device 16. It is noted that, when the engine 12 is to be started for the first time due to switching of the vehicle power from the OFF state to the IG-ON state, the required cranking torque Tcr is likely to be large because the engine 12 has not yet been wormed, so that the engine 12 may be cranked with use of the second starting device 18.

By the way, when the engine 12 is to be started, there is a possibility that the start of the engine 12 with use of the first starting device 16 could fail. In event of failure of the start of the engine 12 with use of the first starting device 16, the cranking of the engine 12 is executed with use of the second starting device 18. Thus, the cranking of the engine 12 with use of the second starting device 18 has a back-up function when the engine 12 is to be started.

Further, there is a possibility that, after the failure of the start of the engine 12 with use of the first starting device 16, the start of the engine 12 with use of the second starting device 18 also could fail. The failure of the start of the engine 12 using the second starting device 18 may be caused, for example, due to a temporary overlap between operation of the starter motor 32 and operations of the electrical equipment 22 with high current load. Thus, there is a possibility that the start of the engine 12 could be successfully done by cranking the engine 12 by using the second starting device 18.

Therefore, in the present embodiment, when the engine 12 is to be started, in a case in which the start of the engine 12 by cranking the engine 12 with use of the first starting device 16 fails and then the start of the engine 12 by cranking the engine 12 with use of the second starting device 18 fails, too, the starting control portion 76 cranks the engine 12 by using the second starting device 18 again.

Since the cranking of the engine 12 with use of the second starting device 18 has the back-up function, it is better not to execute the idle stop control CTspidl in a case in which the start of the engine 12 using the second starting device 18 cannot be guaranteed. The starting control portion 76 inhibits execution of the idle stop control CTspidl in such a case in which the start of the engine 12 using the second starting device 18 cannot be guaranteed. On the other hand, the starting control portion 76 allows the execution of the idle stop control CTspidl in the case in which the start of the engine 12 using the second starting device 18 can be guaranteed.

It is possible to guarantee the start of the engine 12 using the second starting device 18 when the low voltage battery 34 is in good condition. The condition of the low voltage battery 34 can be determined depending on an engine-start voltage VLst that is a value of the DC/DC power supply voltage VLdc as the output voltage of the low voltage battery 34 at a point of time at which the start of the engine 12 using the second starting device 18 is successfully done. The engine-start voltage VLst is the value of the DC/DC power supply voltage VLdc upon successful start of the engine 12 using the second starting device 18. That is, the engine-start voltage VLst is the value of the DC/DC power supply voltage VLdc at a point of time at which the engine 12 is placed in the complete explosion state whereby the cranking of the engine 12 is completed.

Figure 2:
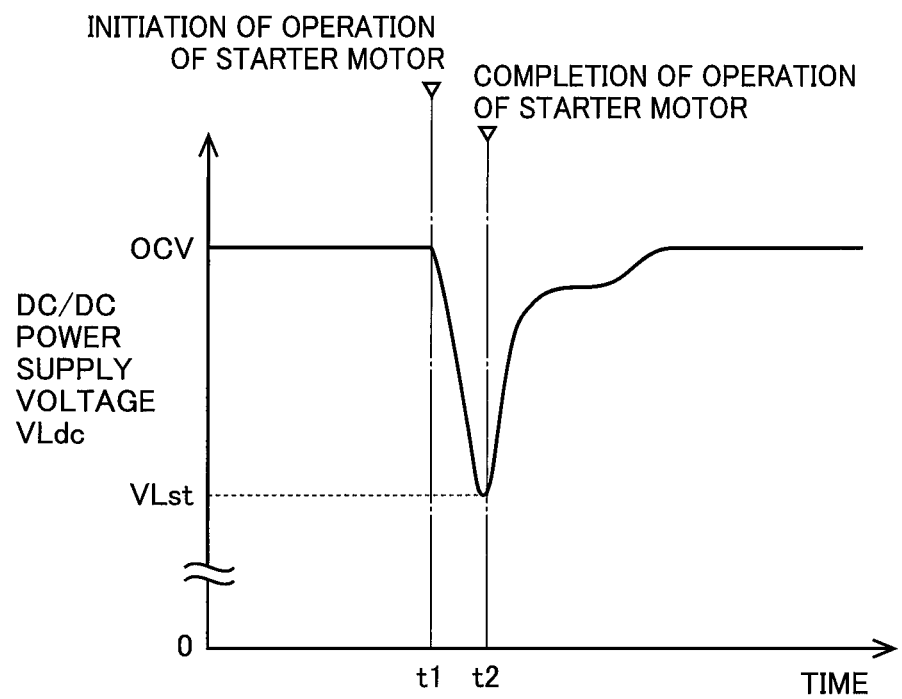
FIG. 2 is a view showing, by way of example, change of an output voltage of a low voltage battery when an engine is started with use of a second starting device (starter motor)

FIG. 2 is a view showing, by way of example, change of the DC/DC power supply voltage VLdc as the output voltage of the low voltage battery 34 when the engine 12 is started with use of the second starting device 18. In FIG. 2, time point t1 represents a point of time at which the cranking of the engine 12 using the second starting device 18 is initiated, namely, at which an operation of the starter motor 32 is initiated. As the operation of the starter motor 32 is initiated, the DC/DC power supply voltage VLdc is reduced from an open circuit voltage OCV. When the engine 12 has been successfully started and the operation of the starter motor 32 has been completed, the DC/DC power supply voltage VLdc is increased toward the open circuit voltage OCV (see time point t2 and thereafter). The value of the DC/DC power supply voltage VLdc at the time point t2 at which the start of the engine 12 is successfully done and the operation of the starter motor 32 is completed, corresponds to the engine-start voltage VLst. The open circuit voltage OCV corresponds to a voltage between terminals of the low voltage battery 34 in a stage in which any load is not applied to the low voltage battery 34.

Referring back to FIG. 1, when the start of the engine 12 using the second starting device 18 has been done successfully, the starting control portion 76 determines whether the start of the engine 12 using the second starting device 18 can be guaranteed or not, depending on whether the engine-start voltage VLst is a predetermined voltage value VLstf or higher. The predetermined voltage value VLstf is a threshold value that is predetermined for determining that the low voltage battery 34 is in a condition good enough to guarantee the start of the engine 12 using the second starting device 18, for example.

Specifically described, when the engine-start voltage VLst is not lower than the predetermined voltage value VLstf, an idle-stop inhibition flag, which is a flag for inhibiting execution of the idle stop control CTspidl, is kept OFF by the starting control portion 76. On the other hand, when the engine-start voltage VLst becomes lower than the predetermined voltage value VLstf, the idle-stop inhibition flag is switched to ON by the starting control portion 76. The idle-stop inhibition flag is placed in its ON state when the idle stop control CTspidl is inhibited, and is placed in its OFF state when the vehicle power is in the OFF state. The idle-stop inhibition flag is in its OFF state in a default setting.

Thus, the starting control portion 76 determines the condition of the low voltage battery 34 depending on the engine-start voltage VLst, and inhibits next execution of the idle stop control CTspidl, as needed. From another point of view, if the condition of the low voltage battery 34 is unknown, the next execution of the idle stop control CTspidl can never be allowed, for avoiding failure of the start of the engine 12 when the engine 12 is to be restarted. For example, in a case in which the start of the engine 12 using the first starting device 16 has failed and then the start of the engine 12 using the second starting device 18 also has failed, it might be possible to attempt the cranking of the engine 12 by using the first starting device 16. However, in this arrangement, it is not possible to determine whether the failure of the start of the engine 12 using the second starting device 18 was caused due to the condition of the low voltage battery 34 or not, so that the next execution of the low voltage battery 34 can never be allowed because the start of the engine 12 using the second starting device 18 can never be guaranteed. This disadvantage results in lost of opportunity of the execution of the idle stop control CTspidl. From this point of view, too, it is preferable to execute the cranking of the engine 12 by using the second starting device 18 again in the case in which the start of the engine 12 using the first starting device 16 has failed and then the start of the engine 12 using the second starting device 18 also has failed.

Figure 3:
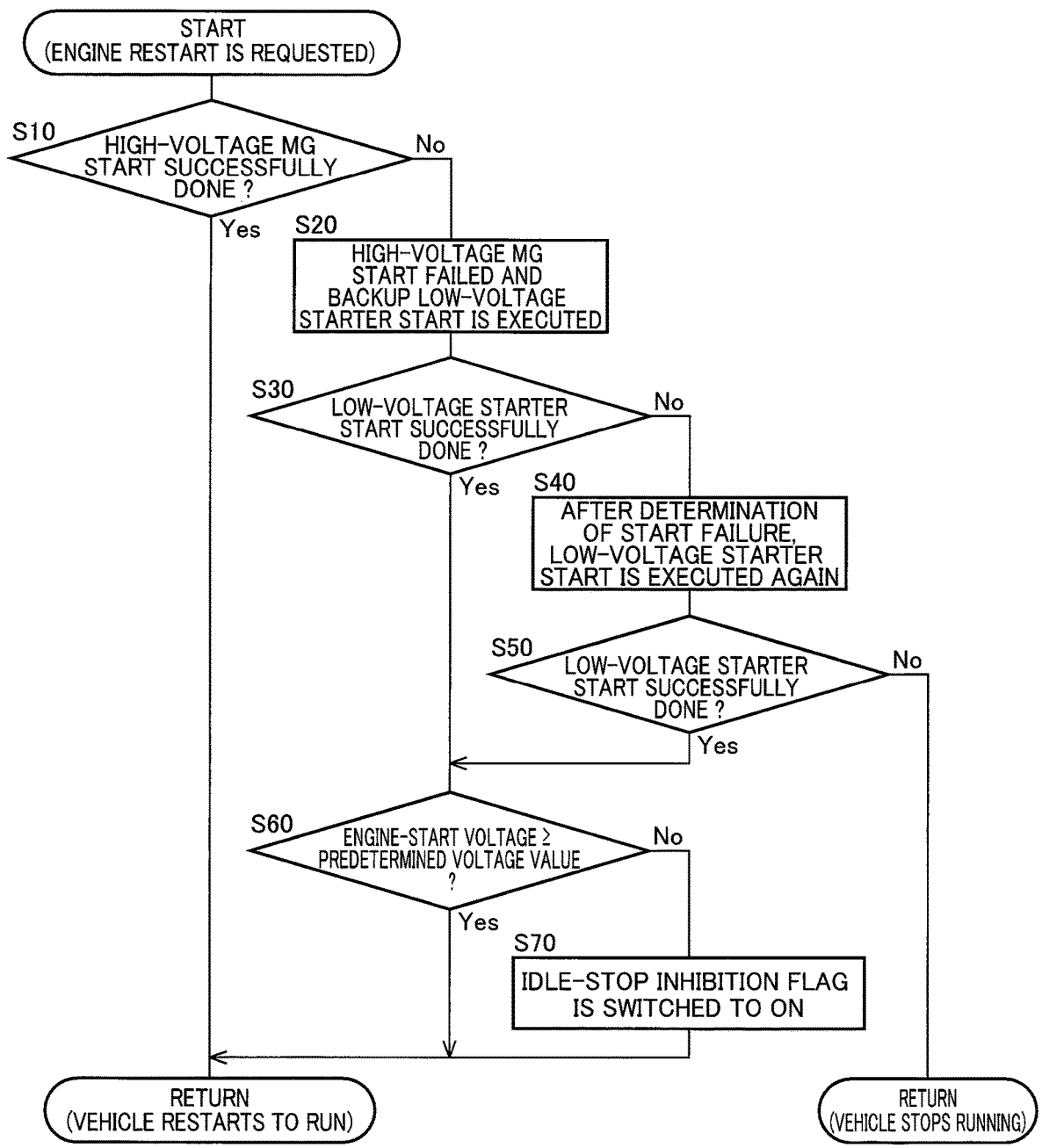
FIG. 3 is a flow chart showing a main part of a control routine executed by an electronic control apparatus, namely, a control routine that is executed for increasing a probability of successful start of the engine when the engine is to be started.

FIG. 3 is a flow chart showing a main part of a control routine executed by the electronic control apparatus 70, namely, a control routine that is executed for increasing a probability of successful start of the engine 12 when the engine 12 is to be started. This control routine is executed when restart of the engine 12 is requested, for example, upon termination of the idle stop control CTspidl.

Each of steps of the control routine shown by the flow chart of FIG. 3 corresponds to function of the starting control portion 76. As shown in FIG. 3, the control routine is initiated with step S10 that is implemented to determine whether a high-voltage MG start that is the start of the engine 12 by the first starting device 16 (that includes the electric motor MG and the high voltage battery 26) has been successfully done or not. When a negative determination is made at step S10, step S20 is implemented to execute a low-voltage starter start that is the start of the engine 12 by the second starting device 18 (that includes the starter motor 32 and the low voltage battery 34), wherein the low-voltage starter start serves as a backup for failure of the high-voltage MG start. Then, step S30 is implemented to determine whether the low-voltage starter start has been successfully done or not. When a negative determination is made at step S30, step S40 is implemented to execute the low-voltage starter start again. Then, step S50 is implemented to determine whether the low-voltage starter start has been successfully done or not. When an affirmative determination is made at step S50, step S60 is implemented to determine whether the engine-start voltage VLst is at least predetermined voltage value VLstf or not. When a negative determination is made at step S60, step S70 is implemented whereby the idle-stop inhibition flag is switched to ON. When an affirmative determination is made at step S10 or at step S60, or after implementation of step S70, one cycle of execution of the control routine is terminated, and the vehicle 10 restarts to run. When a negative determination is made at step S50, one cycle of execution of the control routine is terminated, and running of the vehicle 10 is stopped. In this case, the start button 24 has to be operated by the vehicle driver, for example, so as to restart the vehicle 10 to run.

As described above, in the present embodiment, in the case in which the start of the engine 12 by cranking the engine 12 by using the first starting device 16 has failed and then the start of the engine 12 by cranking the engine 12 by using the second starting device 18 also has failed, the engine 12 is cranked by using the second starting device 18 again. The failure of the start of the engine 12 using the second starting device 18 may be caused due to a temporary overlap between operation of the starter motor 32 and operations of the electrical equipment 22, so that the start of the engine 12 could be successfully done by reattempting the start of the engine 12 using the second starting device 18. Thus, it is possible to increase the probability of successful start of the engine 12 when the engine 12 is to be started.

In the present embodiment, when the engine 12 is to be started, the engine 12 is cranked by using the first starting device 16 with a higher priority than using the second starting device 18, such that the execution of the idle stop control CTspidl is allowed in the case in which it is determined that the start of the engine 12 by cranking the engine 12 by using the second starting device 18 is guaranteed, and such that the execution of the idle stop control CTspidl is inhibited in the case in which it is determined that the start of the engine 12 by cranking the engine 12 by using the second starting device 18 is not guaranteed. Therefore, it is possible to avoid or suppress the failure of the start of the engine 12 after the idle stop control CTspidl is terminated.

In the present embodiment, in the case in which the engine 12 has been successfully started by cranking the engine 12 by using the second starting device 18, it is determined whether the start of the engine 12 by cranking the engine 12 by using the second starting device 18 is guaranteed or not, depending on whether the engine-start voltage VLst is at least the predetermined voltage value VLstf or not. Thus, it is possible to estimate or know the condition of the low voltage battery 34, with reference to the engine-start voltage VLst, so that it is possible to avoid unnecessary inhibition of the execution of the idle stop control CTspidl, i.e., lost of opportunity of the execution of the idle stop control CTspidl, which could be caused if the condition of the low voltage battery 34 is unknown.

In the present embodiment, the engine 12 is cranked by using the second starting device 18 in place of using the first starting device 16, in the case in which it is determined that the vehicle 10 is in the cryogenic environment that disables the electric motor MG from being appropriately controlled when the engine 12 is to be started. Thus, it is possible to avoid or suppress the failure of the start of the engine 12.

In the present embodiment, the idle stop control CTspidl includes the normal idle-stop control S&S and the pre-start-stage idle-stop control FIS, so that it is possible to improve the energy efficiency.

While the preferred embodiment of this invention has been described in detail by reference to the drawings, it is to be understood that the invention may be otherwise embodied.

For example, in the above-described embodiment, the control routine shown in the flow chart of FIG. 3 is executed when the restart of the engine 12 is requested upon termination of the idle stop control CTspidl. However, this is not essential. For example, the control routine of FIG. 3 may be executed when first start of the engine 12 is requested upon switching of the vehicle power from the OFF state to the IG-ON state.

In the above-described embodiment, the idle stop control CTspidl includes the normal idle-stop control S&S and the pre-start-stage idle-stop control FIS. However, the idle stop control CTspidl does not necessarily have to include both of the normal idle-stop control S&S and the pre-start-stage idle-stop control FIS, as long as including at least one of the normal idle-stop control S&S and the pre-start-stage idle-stop control FIS. Even without one of the normal idle-stop control S&S and the pre-start-stage idle-stop control FIS being included in the idle stop control CTspidl, it is possible to obtain the effect of improving the energy efficiency.

In the above-described embodiment, the vehicle 10 may be also a series-type hybrid electric vehicle, and does not necessarily have to include the automatic transmission 14.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine
16: first starting device
18: second starting device
22: electrical equipment
26: high voltage battery (high-voltage power supply device)
32: starter motor
34: low voltage battery (low-voltage power supply device)
70: electronic control apparatus (control apparatus)
76: starting control portion
MG: electric motor

What is claimed is:

1. A control apparatus for a vehicle that is provided with (i) an engine, (ii) a first starting device including an electric motor connected to the engine in a power transmittable manner and a high-voltage power supply device configured to supply and receive an electric power to and from the electric motor, such that the first starting device is configured to crank the engine by using the electric motor, (iii) a second starting device including a starter motor configured to drive and rotate the engine and a low-voltage power supply device chargeable by the high-voltage power supply device and configured to supply the electric power to the starter motor, such that the second starting device is configured to crank the engine by using the starter motor, and (iv) a plurality of kinds of electrical equipment configured to be operated by the electric power supplied from the low-voltage power supply device, the control apparatus comprising a starting control portion that is configured, in a case in which start of the engine by cranking the engine by using the first starting device has failed and then the start of the engine by cranking the engine by using the second starting device has failed, to crank the engine by using the second starting device again, wherein, when the engine is to be started, the starting control portion is configured to crank the engine by using the first starting device with a higher priority than using the second starting device, and wherein the starting control portion is configured to allow execution of an idle stop control for temporarily stopping the engine in a case in which the starting control portion determines that the start of the engine by cranking the engine by using the second starting device can be made, and is configured to inhibit the execution of the idle stop control in a case in which the starting control portion determines that the start of the engine by cranking the engine by using the second starting device cannot be made.

2. The control apparatus according to claim 1,
wherein the starting control portion is configured, in a case in which the engine has been successfully started by cranking the engine by using the second starting device, to determine whether the start of the engine by cranking the engine by using the second starting device can be made or not, depending on whether an output voltage of the low-voltage power supply device upon successful start of the engine is at least a predetermined voltage value or not.

3. The control apparatus according to claim 1,
wherein the starting control portion is configured to crank the engine by using the second starting device in place of using the first starting device, in a case in which the starting control portion determines that the vehicle is in a cryogenic environment that disables the electric motor from being controlled when the engine is to be started.

4. The control apparatus according to claim 1,
wherein the idle stop control includes at least one of a control executed to temporarily stop the engine during running or stop of the vehicle and a control executed to keep stopping the engine without starting the engine when the vehicle has not started to run after power ON of the vehicle.

\* \* \* \* \*